Figure 1:
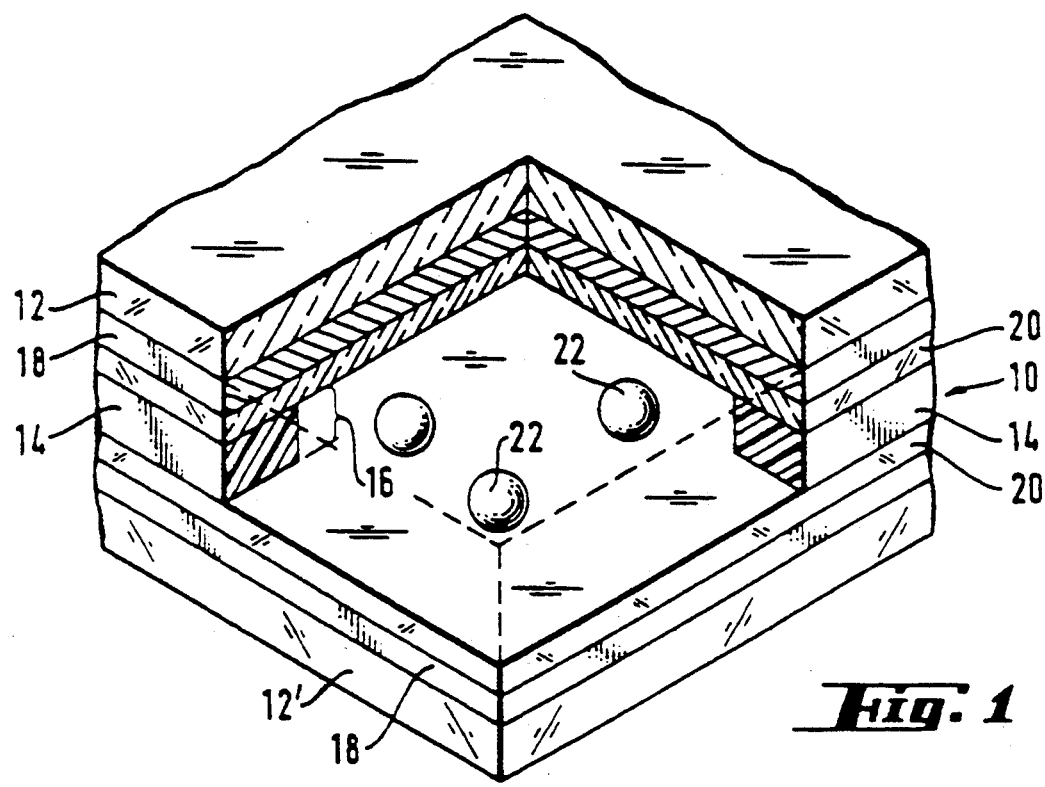

United States Patent [19]

Escher et al.

[11] Patent Number: 5,353,136
[45] Date of Patent: Oct. 4, 1994

[54] FERROELECTRIC LIQUID CRYSTAL WITH POSITIVE DIELECTRIC ANISOTROPY, CHEVRON STRUCTURE AND GREY SCALE

[75] Inventors: Claus Escher, Mühltal; Hans-Rolf Dübal, Königstein/Taunus, both of Fed. Rep. of Germany; Takamasa Harada, Inzai, Japan; Gerhard Illian, Frankfurt am Mian, Fed. Rep. of Germany; Mikio Murakami, Kakegawa, Japan; Dieter Ohlendorf, Liederbach, Fed. Rep. of Germany

[73] Assignee: Hoechst Aktiengesellschaft, Frankfurt am Main, Fed. Rep. of Germany

[21] Appl. No.: 778,175
[22] PCT Filed: Jun. 9, 1990
[86] PCT No.: PCT/EP90/00901
§ 371 Date: Dec. 13, 1991
§ 102(e) Date: Dec. 13, 1991
[87] PCT Pub. No.: WO90/16007
PCT Pub. Date: Dec. 27, 1990

[30] Foreign Application Priority Data

Jun. 17, 1989 [DE] Fed. Rep. of Germany ....... 3919839

[51] Int. Cl.$^5$ .................. G02F 1/13; G02F 1/1343; G02F 1/137
[52] U.S. Cl. ............................... 359/56; 359/84; 359/100; 345/89; 345/97
[58] Field of Search ............... 359/100, 104, 56, 55; 340/784; 345/89, 97

[56] References Cited

U.S. PATENT DOCUMENTS

| | | | |
|---|---|---|---|
| 4,367,924 | 1/1983 | Clark et al. | 359/104 X |
| 4,668,051 | 5/1987 | Mourey et al. | 359/56 |
| 4,813,767 | 3/1989 | Clark et al. | 359/76 |
| 4,904,064 | 2/1990 | Lageswall et al. | 359/56 |
| 4,927,242 | 5/1990 | Aoki et al. | 359/99 |
| 5,062,691 | 11/1991 | Tristani-Kendsa et al. | 359/56 |
| 5,168,381 | 12/1992 | Walba | 359/53 |

OTHER PUBLICATIONS

Structures and Applications of SSFLC devices, Japan Display 1986, Clark et al, Oct. 1986.

*Primary Examiner*—William L. Sikes
*Assistant Examiner*—Kenneth Parker
*Attorney, Agent, or Firm*—Curtis, Morris, & Safford

[57] ABSTRACT

A method of driving a ferroelectric liquid crystal element which enlarges the effective cone angle. A ferroelectric liquid crystal is held between two substrates such that the helix is suppressed and a chevron layer structure is present. The ferroelectric material has a positive dielectric anisotropy. A first pulse is applied which causes switching from one state to the other, and a subsequent smaller AC pulse is applied which does not cause switching. The second pulse voltage control the effective cone angle, enabling grey scale.

4 Claims, 5 Drawing Sheets

FERROELECTRIC LIQUID CRYSTAL WITH POSITIVE DIELECTRIC ANISOTROPY, CHEVRON STRUCTURE AND GREY SCALE

Switching and display elements in which ferroelectric liquid crystals serve as switching and display medium (FLC displays) are described, for example, in U.S. Pat. No. 4,367,924. They comprise a layer composed of a ferroelectric liquid-crystalline medium (FLC) which are enclosed on both sides by electrically insulating layers, electrodes and boundary sheets, usually glass sheets. In addition, they contain a polarizer when operated in the guest-host mode and two polarizers when operated in the birefringence mode. The electrically insulating layers are intended to prevent electric short-circuits between the electrodes and the diffusion of ions out of the glass of the boundary sheets into the FLC. Furthermore, at least one and preferably both insulating layers serve as an orientation layer which brings the FLC into a configuration at which the longitudinal axes of the molecules of the FLC are parallel to one another and in which the smectic planes are arranged perpendicular to or at an angle relative to the. orientation layer. In this arrangement, the FLC molecules can adopt two possible and equivalent orientations, into which they can be brought by applying pulses of an electric field. In each case, they remain in the last-generated orientation, even if the field is switched off or the display is short-circuited. This means that FLC displays can be switched between two stable states. The switching times are in the region of $\mu s$ and decrease with increasing spontaneous polarization of the FLC used.

Compared with the previously used liquid crystal displays, which are all non-ferroelectric, FLC displays have in particular the advantage that the obtainable multi-plexing ratio, i.e., the maximum number of lines which can be addressed in a time sequence ("multiplexing") is considerably higher than in the known non-ferroelectric displays.

A serious disadvantage of FLC displays is their hitherto too low optical contrast of multiplex-driven displays. In this form of addressing, the maximum possible switching angle is not fully utilized, but only a so-called effective switching angle $\theta_{eff}$. This is explained by undesirable twist states or by the presence of tilted smectic layers [see N. Hiji, Y. Ouchi, H. Takezoe, A. Fukuda, Jap. J. Appl. Phys. 27, 8 (1988)]. In order to improve the contrast, special addressing modes have been developed, which in the case of dielectrically negative FLC material (i.e., LC material having a $\Delta\epsilon < 0$) lead to a widening of the effective switching angle $\theta_{eff}$ [see T. Umeda, T. Nagata, A. Mukoh, Y. Hori, Jap. J. Appl. Phys. 27, 2187 (1988) and Y. Sato, T. Tanaka, M. Nagata, H. Takeshita, S. Morozumi, Proc. 6th Intl. Display Res. Conf. 1986, p. 348].

Although this method produces certain improvements in the contrast, they are by no means sufficient. In addition, undesirable side effects are observed especially when the attempt is made to maximize the effect of contrast improvement by suitable addressing. These undesirable effects are irreversible transformations in the geometry of the FLC cell, so-called textural transformations [see H. -R. Dübal, C. Escher, D. Ohlendorf, Proc. 6th Intl. Symp. on Electrets, Oxford, England 1988, p. 334]. These transformations are unfavorable because they considerably lengthen the switching times of the displays.

Surprisingly, it has now been found that, even in the case of dielectrically positive FLC material (FLC material having a $\Delta\epsilon > 0$), the effective switching angle can be enlarged and thus the contrast increased by suitable multiplex addressing. A particular advantage of this method is that a textural transformation does not occur or at least only very slightly even when the effect is maximized.

A liquid-crystalline material which forms an $S_C^*$, $S_F^*$, $S_G^*$, $S^*$ or $S_J^*$ phase proves to be particularly suitable. Another particularly suitable material is an FLC material having N* phase in a temperature range above the ferroelectric phase, since in this case the orientation properties of the LC material are improved.

Figure 2:
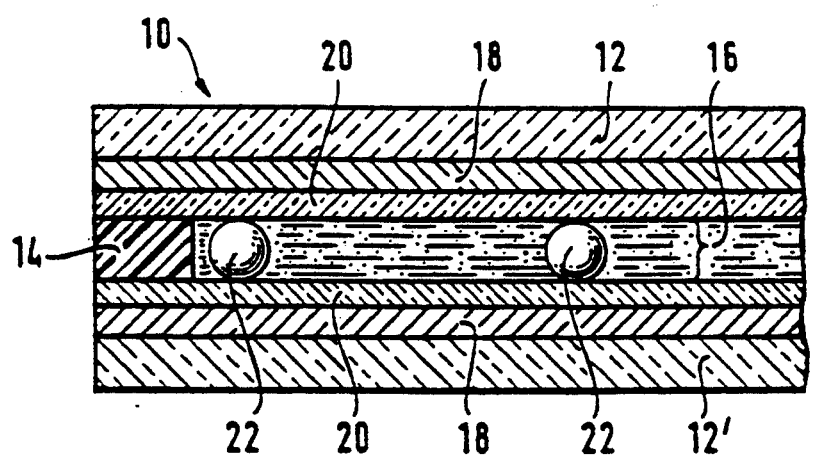

The construction of the liquid crystal element according to the invention is illustrated by means of FIGS. 1 and 2. The liquid crystal element 10 comprises two transparent sheets, (12, 12') and an interstice (16) bordered by sealing material (14). The transparent sheets are made of glass, plastic or similar material. The liquid-crystalline material is poured into the interstice (16). On the inner surface of the transparent sheets, electrodes (18) which are also transparent and are composed, for example, of ITO are present. On both sides of the interstice, orientation layers (20) are also present. Structures which serve as spacers (22) are, for example, those of spherical shape and uniform diameter, which are uniformly distributed between both transparent sheets 12 and 12'. The ferroelectric, liquid-crystalline material is oriented by orientation layers which are aligned by rubbing.

When the chiral, smectic liquid crystal material is poured into a thin cell, the helix is unwound. When a single-axis orientation layer is used, a chevron structure is formed, which is characteristic of tilted smectic liquid crystals, in particular in the case where the liquid crystals, upon cooling to form the tilted smectic phase, pass through an orthogonal smectic phase. In the smectic C* phase, the molecules in thin cells have two stable states. In order to prevent the formation of a chevron structure, it is, for example, possible to use an orientation layer obtained by vapor deposition of silicon oxide at an angle, which is however costly and leads to relatively long switching times.

Liquid crystal molecules have the tendency to align themselves parallel to the transparent sheets (except in the case where strongly tilted orientation layers are used). Owing to the formation of the chevron structure and the tendency of the molecules to align themselves in parallel, the angle between two stable molecular states is smaller than the original cone angle of the liquid-crystalline material. This angle is called effective cone angle $2\theta_{eff}$.

The most important feature of the liquid crystal element according to the invention is that the effective cone angle can be widened without any irreversible change in the texture. It is also possible to address intermediate values of the cone angle $2\theta_{eff}$ selectively by the voltage applied, making it possible to produce gray steps.

Figure 3:
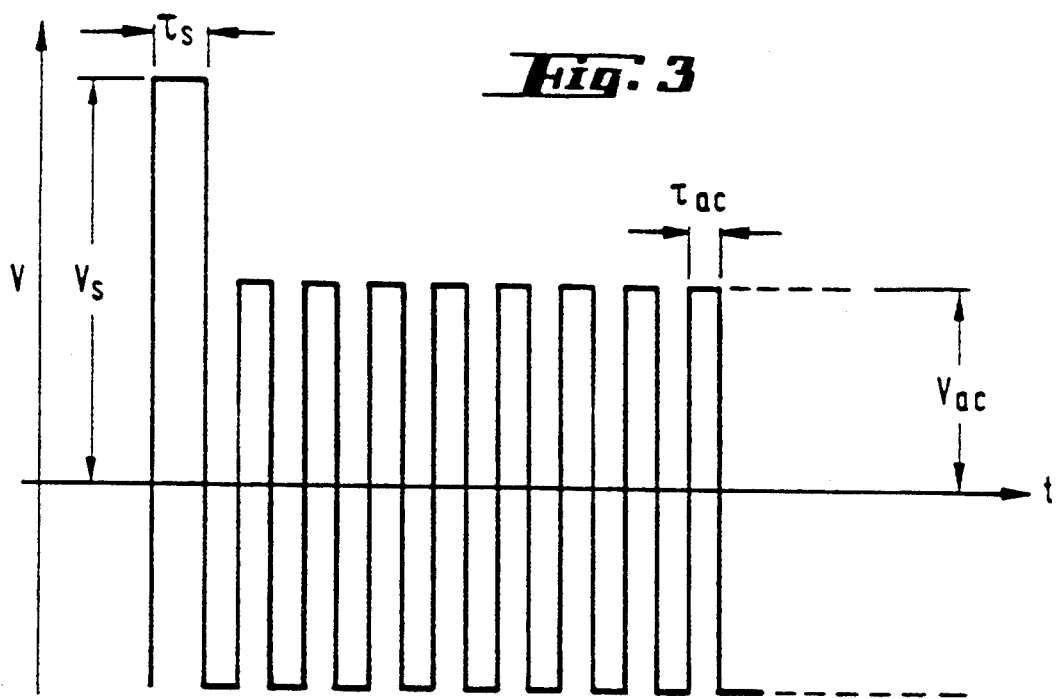

In FIG. 3, the voltage applied to the LC element is plotted against time. A pulse having a high voltage ($V_s$) and a length $\tau_s$, has the effect that the molecules can be switched from one state to the other. The subsequent, smaller alternating current pulses ($V_{ac}$), which have a length $\tau_{ac}$, which has the same or shorter length, stabilize the molecules but do not allow further switching.

The invention is illustrated by the example below:

EXAMPLE 1

A mixture M2 comprising the following two components

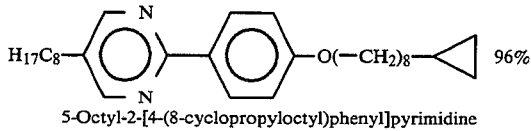 1a

5-Octyl-2-[4-(8-cyclopropyloctyl)phenyl]pyrimidine

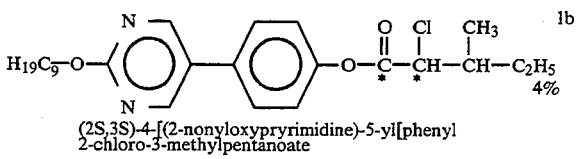 1b (2S,3S)-4-[(2-nonyloxypryrimidine)-5-yl[phenyl 2-chloro-3-methylpentanoate has the following phase sequence

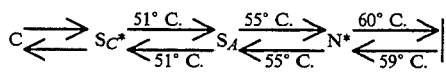

This LC mixture is aligned in the liquid crystal element above by means of an orientation layer rubbed in a parallel direction. The effective cone angle 2 $\theta_{eff}$ is 10 degrees at 38° C., $\Delta\epsilon$ is just +0.6 at 10 KHz $(\Delta\epsilon=\epsilon_\parallel-\epsilon_\perp)$.

Figure 5:
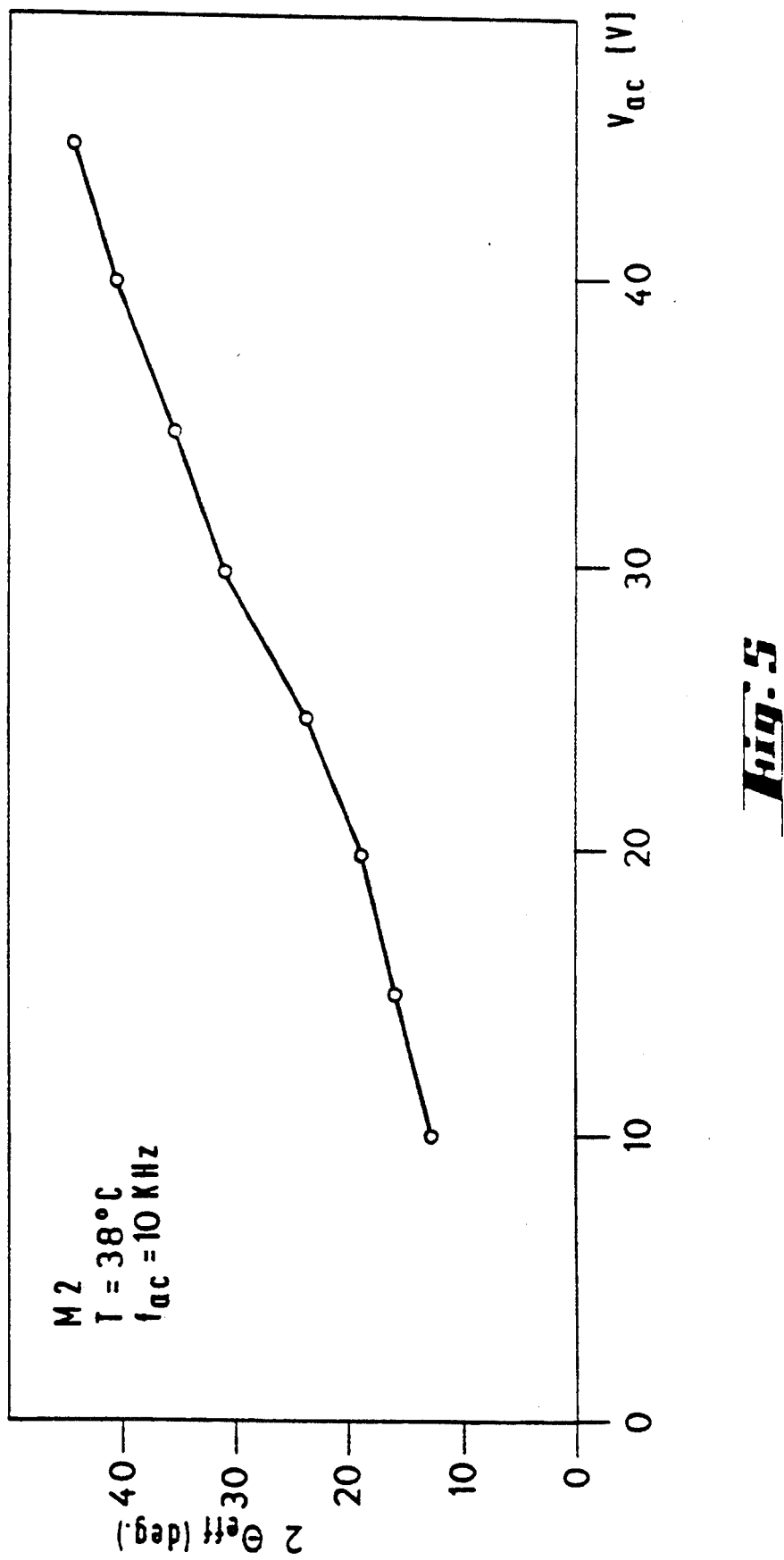

A shown in FIG. 5, the effective cone angle 2 $\theta_{eff}$ increases at an applied voltage $V_{ac}$ of more than 15 Volt in approximately direct proportional to the voltage. Compared with liquid crystal elements equipped with negative dielectric LC mixtures (negative $\Delta\epsilon$), even voltages greater than 25 Volt can be applied to the liquid crystal elements according to the invention without any sudden change in the texture. Changes in texture of liquid crystal elements containing dielectrically negative ferroelectric liquid crystal material have been described, for example, by H. -R. Dübal et al. Proceedings of the 6th International Symposium on Electrets, Oxford, England, 1988, p. 334-338.

In LC mixtures having a negative $\Delta\epsilon$, the observed change in texture can be explained by a deformation of the layer structure. The layer structure of dielectrically positive LC mixtures is not subject to deformation.

Figure 6:
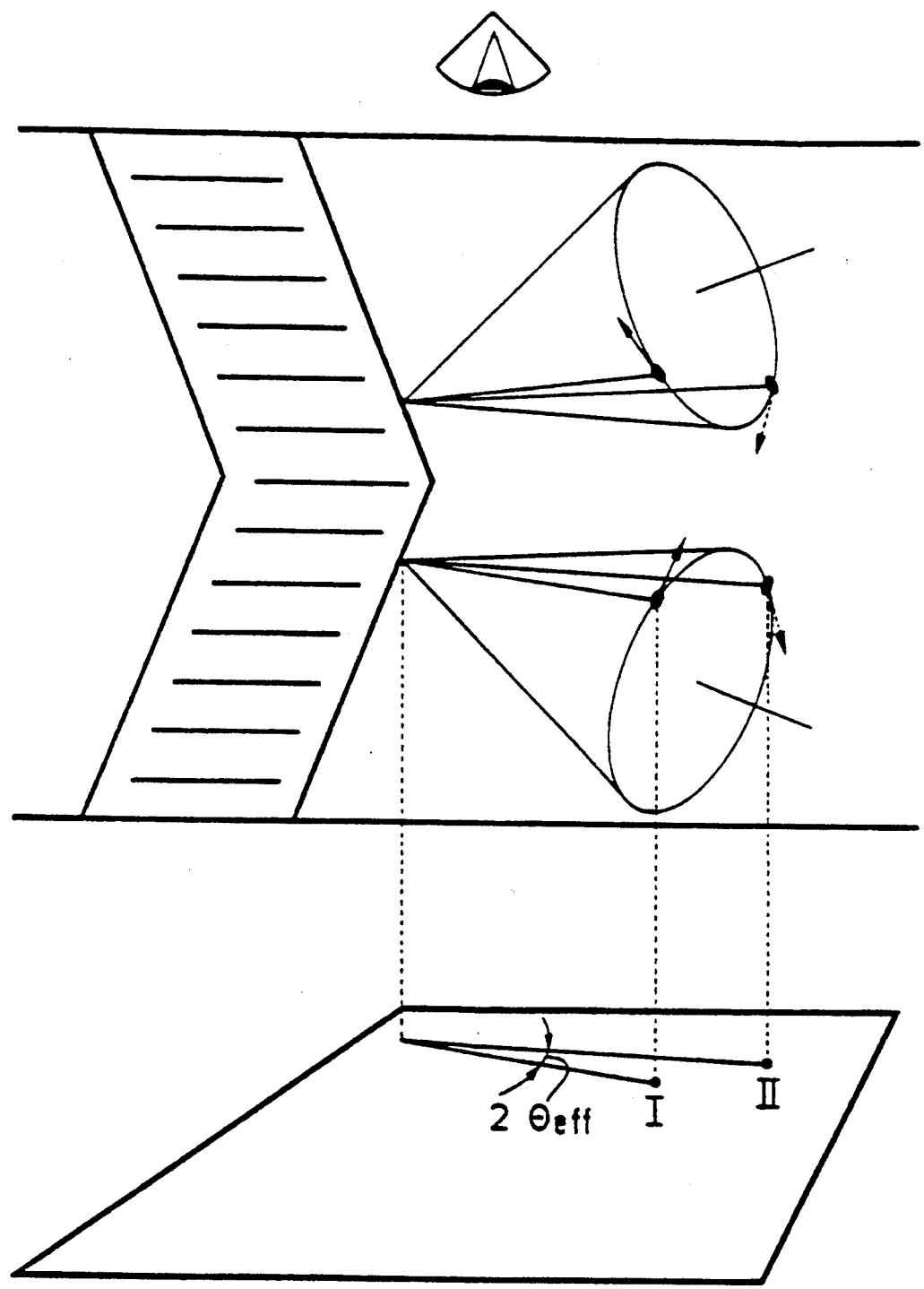
Figure 7:
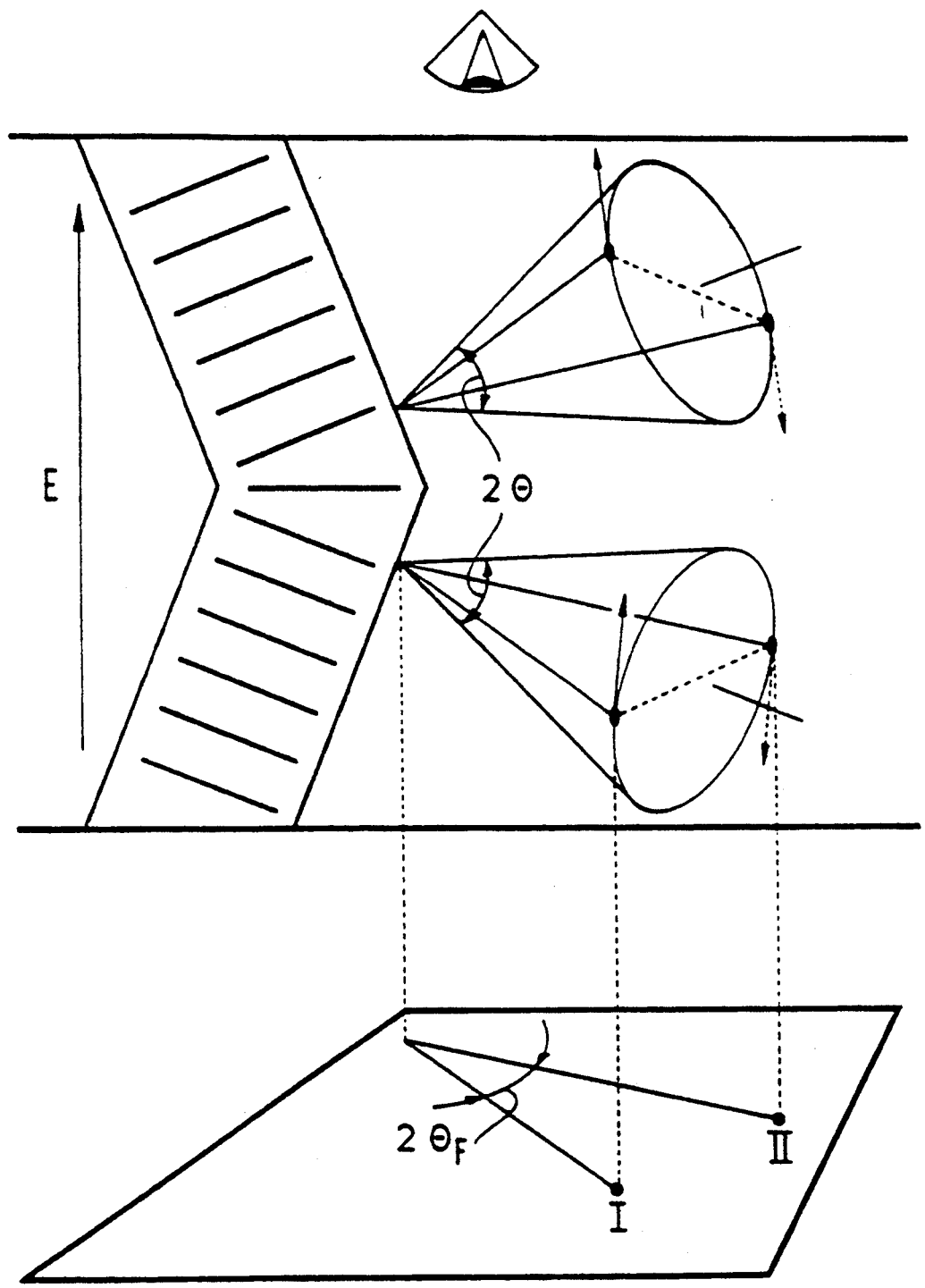

In dielectrically positive LC mixtures, the molecular movement can be illustrated by rotation of the director on the curved surface of a cone, as demonstrated in FIG. 6. The optical properties of the LC element are determined by the effective alignment of the molecules, which here corresponds to the projection of the molecules onto the plane of the glass of the LC cell. The molecules align themselves parallel to the glass sheets. Owing to the formation of a chevron structure in the LC layer, the axis of the smectic tilted cone is tilted relative to the glass or orientation layer, which leads to a reduction in the effective cone angle. If now, as indicated in FIGS. 6, 7, a voltage is initially applied which is large enough for allowing free rotation of the molecules on the curved surface of the cone and then such a voltage that the molecules can no longer rotate but are still stabilized, this state is distinguished by an equilibrium between the electric torque and that of the orientation layer. This results in an enlargement of the effective cone angle.

The liquid crystal element according to the invention, which contains a dielectrically positive LC mixture as the ferroelectric smectic material, has the great advantage that, due to a large cone angle it has good contrast and moreover no irreversible changes in texture at elevated voltages, as a result of which the contrast is not diminished even upon extended use and frequent switching.

COMPARATIVE EXAMPLE

To demonstrate the advantage of the liquid crystal element according to the invention, a dielectrically negative mixture M1 comprising three components is prepared:

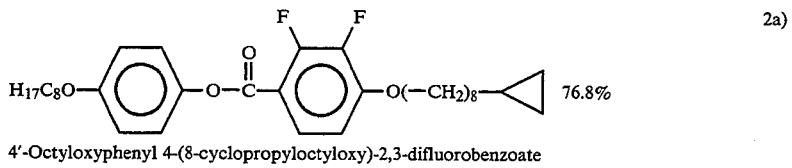 2a)

4'-Octyloxyphenyl 4-(8-cyclopropyloctyloxy)-2,3-difluorobenzoate

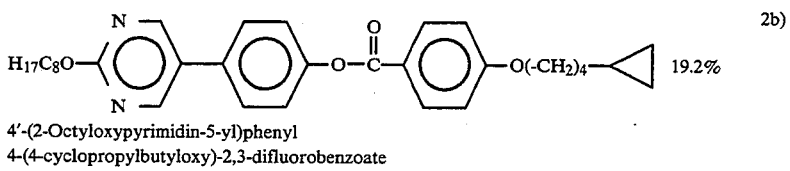 2b)

4'-(2-Octyloxypyrimidin-5-yl)phenyl 4-(4-cyclopropylbutyloxy)-2,3-difluorobenzoate

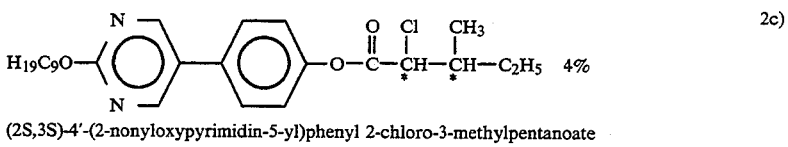 2c)

(2S,3S)-4'-(2-nonyloxypyrimidin-5-yl)phenyl 2-chloro-3-methylpentanoate

This mixture has the following phase sequence:

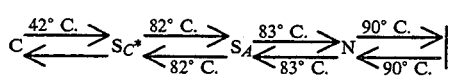

At 10 KHz, $\Delta\epsilon$ is $-0.8$ and the effective cone angle 2 $\theta_{eff}$ is 10 degrees.

Figure 4:
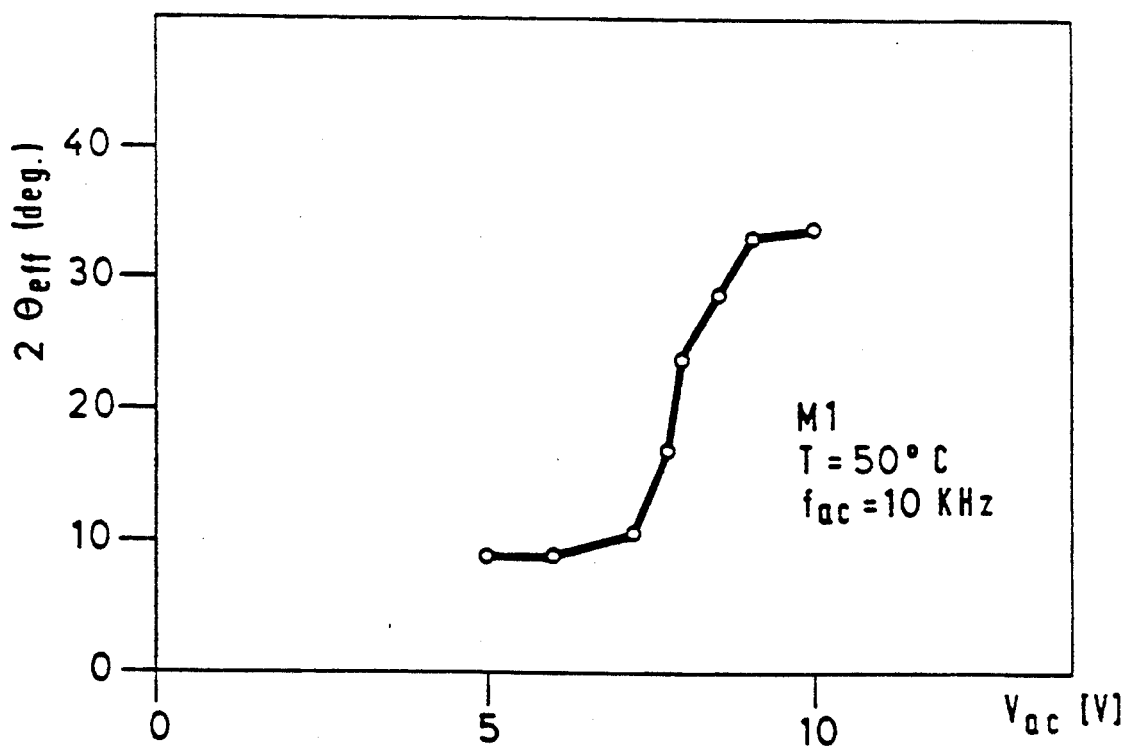

The dependence of the effective cone angle on the voltage $V_{ac}$ applied is shown in FIG. 4. The threshold value of the voltage depends on the absolute value of $\Delta\epsilon$; if a lower threshold voltage is desired, the absolute value of $\Delta\epsilon$ must increase.

As can be easily seen from FIG. 4, the effective cone angle changes form 10 degrees to more than 35 degrees within a relatively narrow voltage range (here from 7 to 10 Volt).

Above 9 Volt, an increase in voltage does not lead to any further widening of the effective cone angle; an irreversible change in texture occurs. This phenomenon of negatively dielectric LC mixtures is caused by a twisting deformation of the liquid crystal film.

The changes in texture upon applying a higher voltage leads to defects in the liquid crystal phase of the switching element with increasing time of operation, which defects have a detrimental effect on the contrast and increase the switching times.

We claim:

1. A process for enlarging the effective cone angle in a liquid crystal element comprising a housing, which contains an interstice bordered by a sealing material between two transparent sheets, and additionally at least one polarization film, at least one rubbed orientation layer, furthermore two electrodes on both inner surfaces of the transparent sheets and a liquid-crystalline, ferroelectric smectic material present in the interstice, wherein the liquid-crystalline material firstly forms a chevron structure, and formation of a helix is suppressed, and secondly has spontaneous polarization and a positive dielectric anisotropy, said process comprising firstly applying a pulse of a high voltage ($V_s$) and a length $\tau_s$ which has the effect that the molecules can be switched from one state to the other, and secondly applying subsequent smaller alternating current pulses ($V_{ac}$), which have a length $\tau_{ac}$, which is the same or shorter than the length of the first pulse, and which do not allow further switching.

2. The process as claimed in claim 1, wherein the liquid-crystalline material forms an $S_C^*$, $S_F^*$, $S_G^*$, $S_I^*$ or $S_J^*$ phase.

3. The process as claimed in claim 1, wherein the liquid-crystalline material has an $N^*$ phase in a temperature range above the ferroelectric phase.

4. The process as claimed in claim 1, wherein grey steps can be controlled with the aid of the effective value of the voltage.

* * * * *